United States Patent
Fujiwara et al.

(10) Patent No.: US 6,298,418 B1
(45) Date of Patent: Oct. 2, 2001

(54) MULTIPROCESSOR SYSTEM AND CACHE COHERENCY CONTROL METHOD

(75) Inventors: Shisei Fujiwara, Ebina; Masabumi Shibata, Kawasaki; Atsushi Nakajima, Hadano; Naoki Hamanaka, Tokyo; Naohiko Irie, Kawasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/975,671

(22) Filed: Nov. 28, 1997

(30) Foreign Application Priority Data

Nov. 29, 1996 (JP) .................................................. 8-320566

(51) Int. Cl.$^7$ .................................................. G06F 12/08
(52) U.S. Cl. .................................................. 711/144; 711/145
(58) Field of Search .................................................. 711/141, 143, 711/3, 113, 118, 119, 120, 121, 124, 144, 145, 147, 150, 156, 168, 210; 710/132

(56) References Cited

U.S. PATENT DOCUMENTS

| | | | |
|---|---|---|---|
| 5,375,220 | * 12/1994 | Ishikawa | 711/141 |
| 5,581,729 | * 12/1996 | Nishtala et al. | 711/143 |
| 5,680,576 | * 10/1997 | Laudon | 711/145 |
| 5,701,422 | * 12/1997 | Kirkland, Jr. et al. | 711/141 |
| 5,737,757 | * 4/1998 | Hassoun et al. | 711/145 |
| 5,987,571 | * 11/1999 | Shibata et al. | 711/141 |

FOREIGN PATENT DOCUMENTS

| | | |
|---|---|---|
| 147792 | 6/1989 | (JP) . |
| 5334261 | 12/1993 | (JP) . |
| 044459 | 2/1995 | (JP) . |
| A-7-281956 | 10/1995 | (JP) . |

OTHER PUBLICATIONS

M.S. Papamacros and J.H. patel, "A Low–overhead Coherence Solution for Multi–processors with Private Cache Memories", Proc. the 11th International Symposium on Computer Architecture, 1984, pp. 348–354.

Yoshizo Takahashi, "Parallel Processing Mechanism", First edition, Maruzen Advanced Technology, Maruzen Co., Ltd., Aug. 25, 1989, pp. 186–1999 (no translation).

\* cited by examiner

Primary Examiner—Reginald G. Bragdon
(74) Attorney, Agent, or Firm—Antonelli, Terry, Stout & Kraus, LLP

(57) ABSTRACT

In a bus or switch coupled system having a plurality of processor modules and a memory module, the memory module is provided with a unit for returning a write completion acknowledgement (WRITE_ACK) to a write requesting processor module. If a processor module PM1 is under execution of write-back of a cache line upon arrival of a cache coherence check (CCC) issued from a processor module with a cache miss of the cache line, an "INVALID" signal is returned to the CCC issued processor module PMO after a write completion acknowledgment from the memory module is confirmed and the cache line is invalidated. After confirming the "INVALID" signals from other processor modules, the CCC issued processor module issues a READ transaction to the memory module to obtain correct latest data reflecting the write-back data of the processor module.

8 Claims, 17 Drawing Sheets

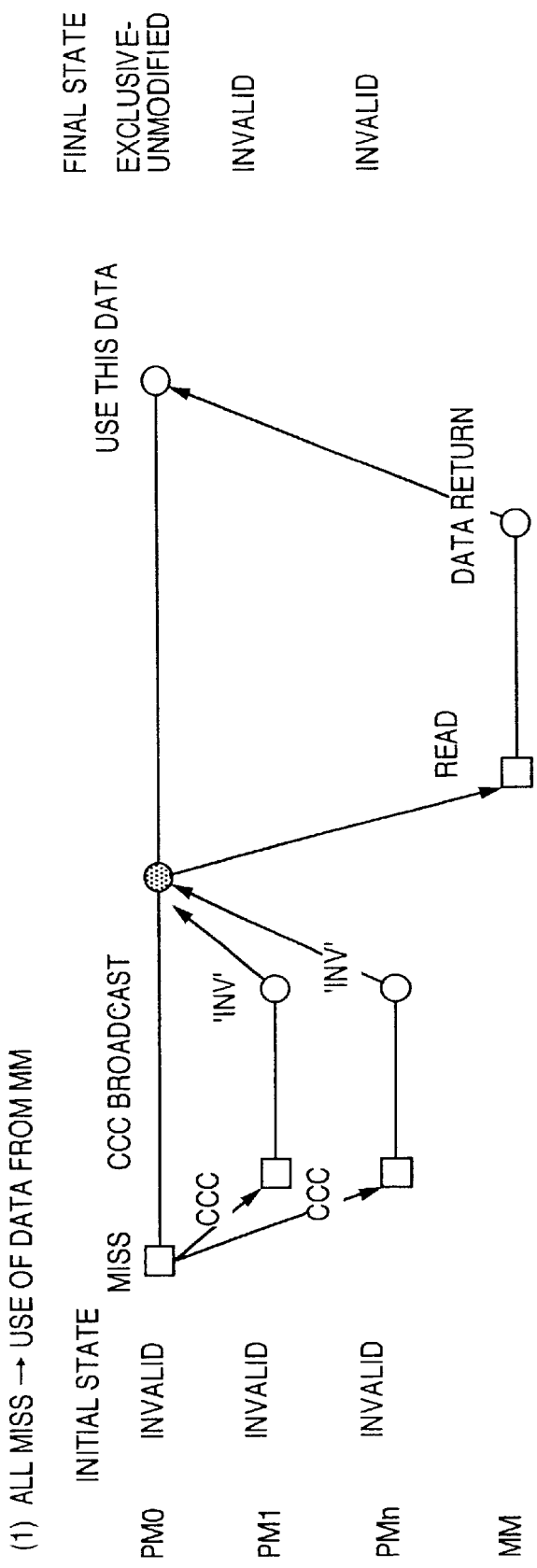

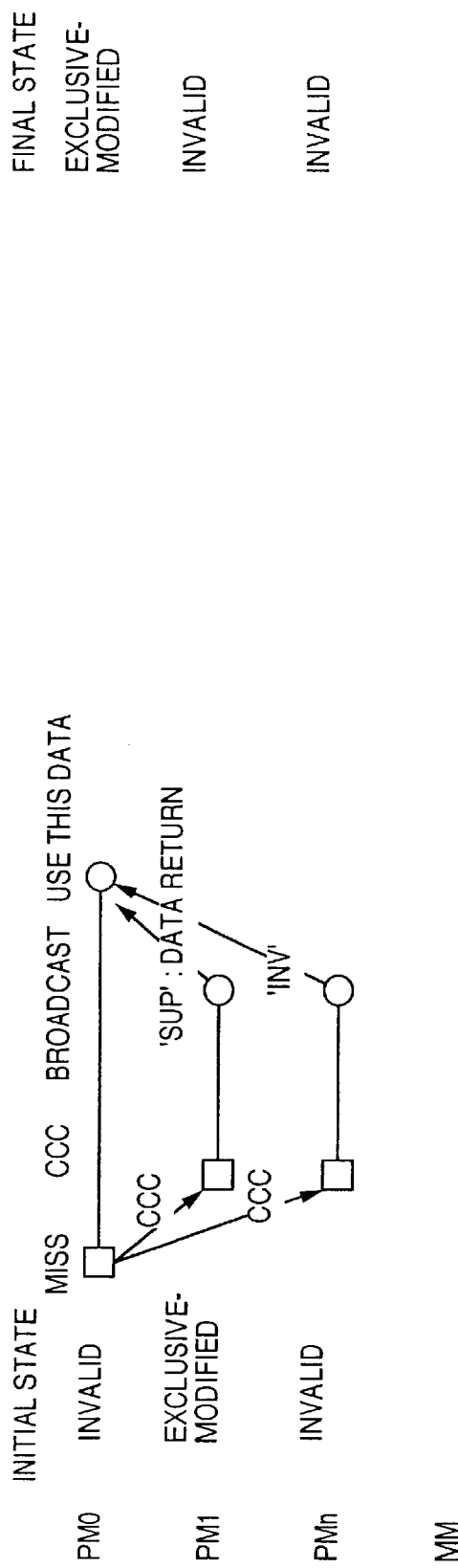

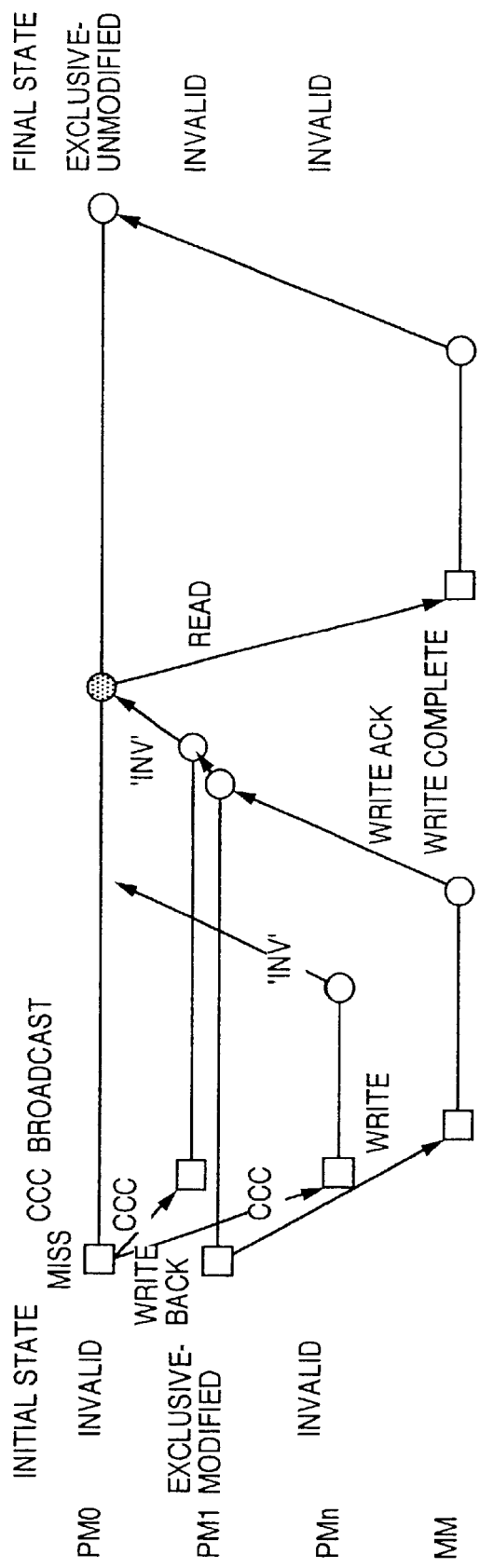

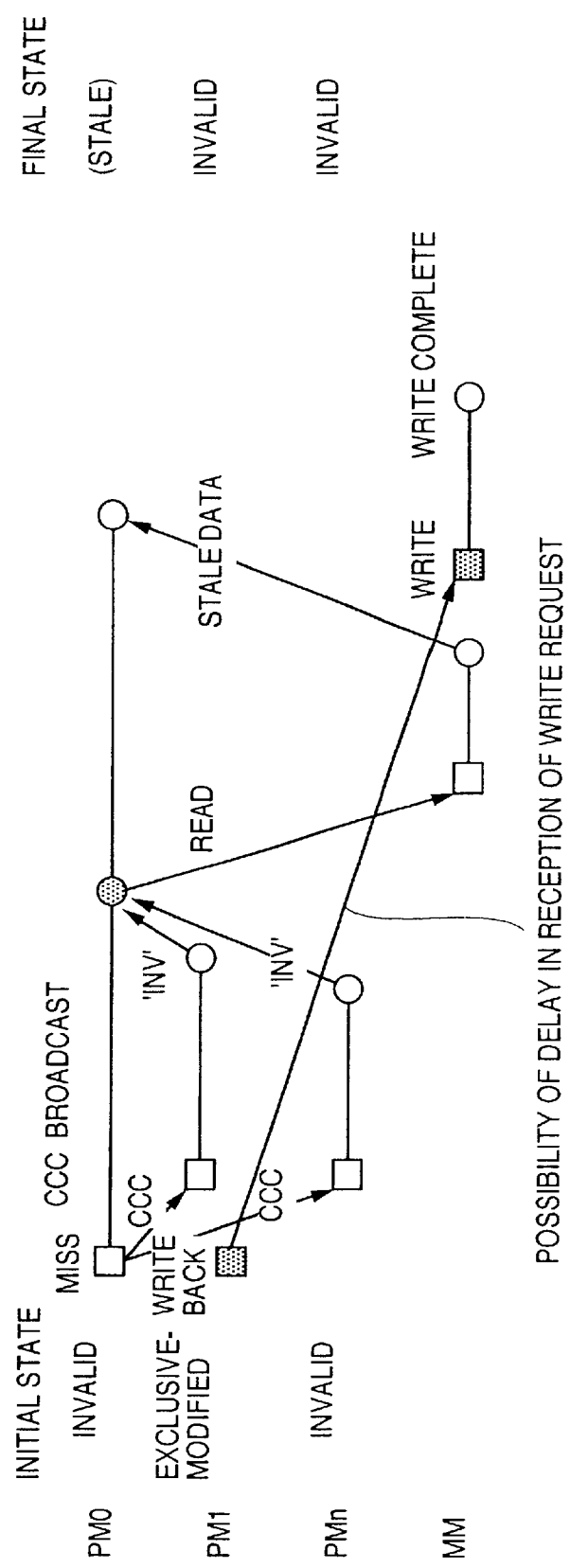

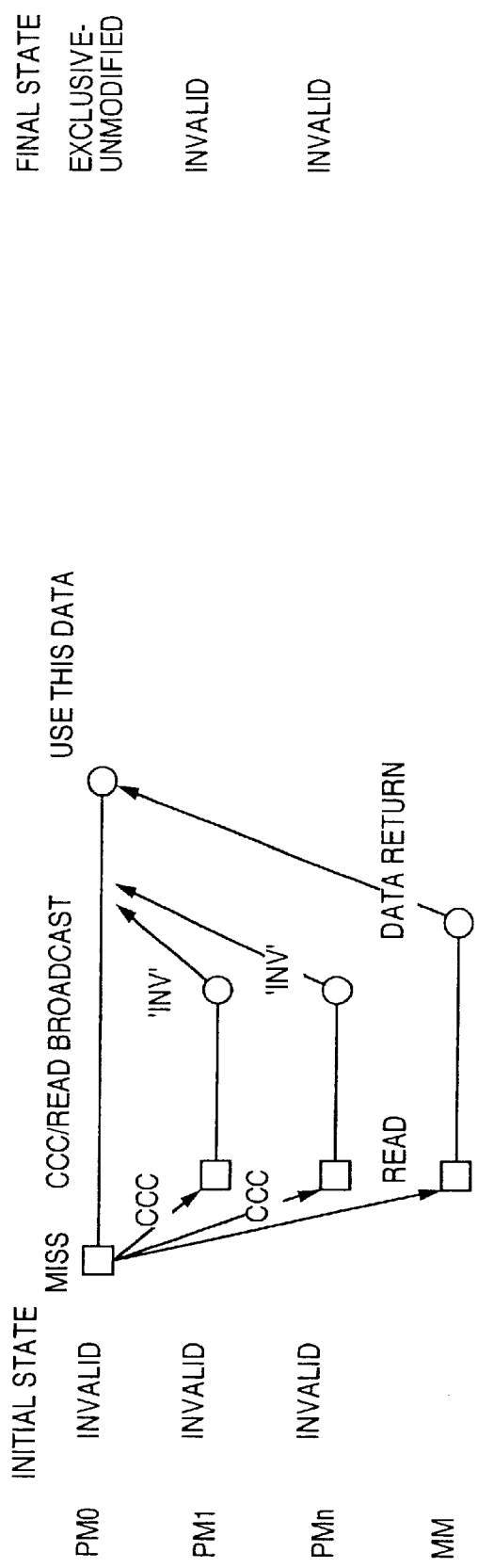

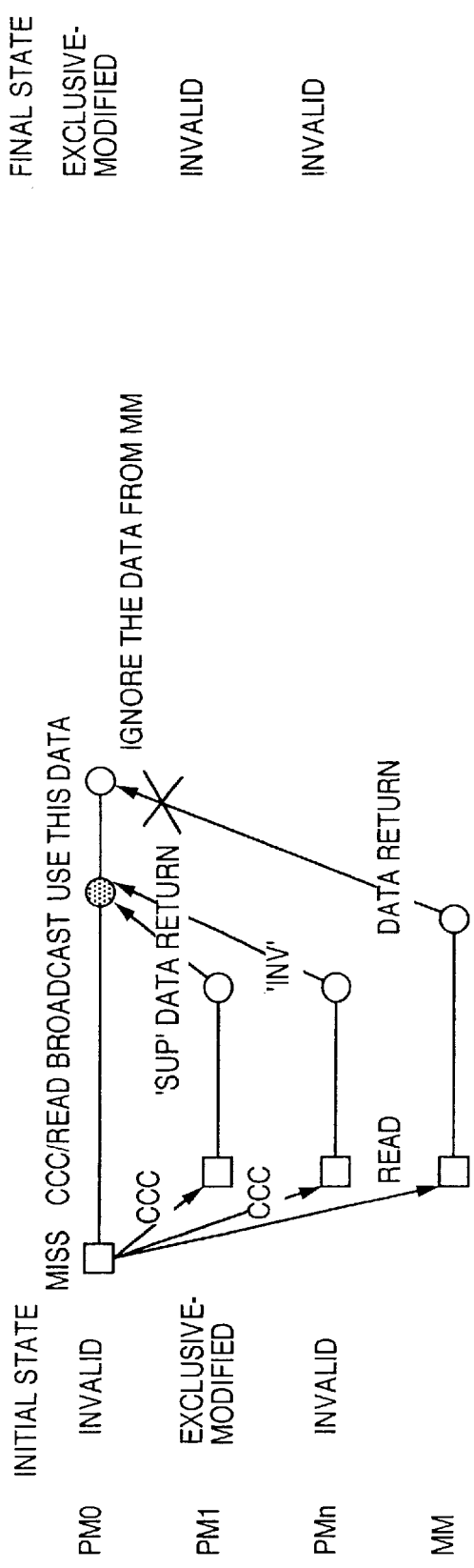

(3) (a) PM DURING EXECUTION OF WRITE-BACK NOTIFY FETCH MISS AFTER WRITE-BACK COMPLETION CONFIRMATION.
PM WITH CACHE MISS REREAD FROM MM

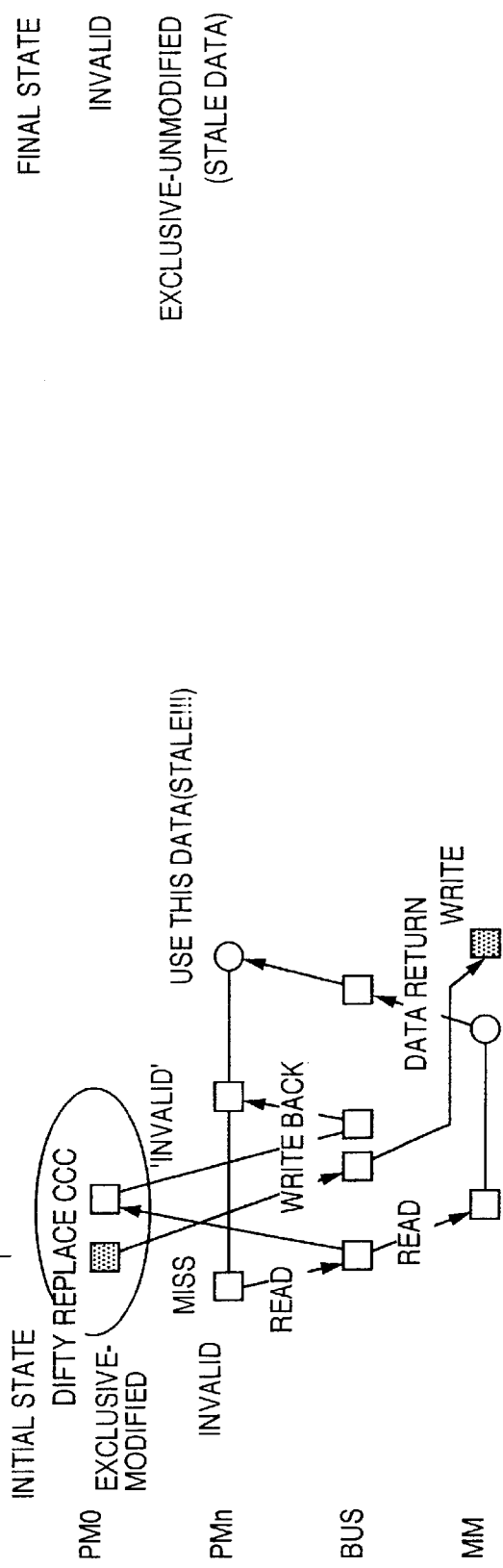

MULTIPROCESSOR SYSTEM AND CACHE COHERENCY CONTROL METHOD

BACKGROUND OF THE INVENTION

1. Field of the Invention

The present invention relates to a tightly coupled multiprocessor system in which a main storage is shared by a plurality of processors, and to techniques effective for the application to cache coherency control.

2. Description of the Related Art

It is common for a presently used processor module to have a high speed internal cache memory, which temporarily stores data transferred to and from an external main storage or the like, in order to speed up the operation. In a tightly coupled multiprocessor system having a main storage which is shared by a plurality of processors each having a cache memory, data in the main storage at the same address is dispersively present in cache memories of a plurality of processors. This dispersed data is updated independently at each processor if write-back caching is performed in which updated write data is also stored in the main storage via the cache memory. In this case, there is a possibility that the data in the cache memory at each processor is different (dirty) from the data in the main storage at the same address. Therefore, if any one of processors issues a read request to the main storage, it becomes essential to perform cache coherency control in order to ensure the correct operation of the system, i.e., to ensure time sequential integrity (coherency) of data in the cache memory of each processor and in the main storage, in other words, to ensure that read data is the newest data.

Typical techniques of a cache coherency control scheme for such a tightly coupled multiprocessor system are disclosed in various documents such as M. S. Papamacros and J. H. Paten, "A Low-overhead Coherence Solution for Multiprocessors with Private Cache Memories", Proc. the 11th International Symposium on Computer Architecture, 1984. pp. 348–354.

This document defines the following cache states of a multiprocessor system having a plurality of processor modules sharing a main storage (memory module) via a bus. These cache states include: (a) Invalid (data is invalid); (b) Shared-Unmodified (data is also present in the cache memory of another processor and is the same as the data in the main storage); (c) Exclusive-Modified (data is present only in the cache memory in concern and not the same as the data in the main storage); and (d) Exclusive-Unmodified (data is present only in the cache memory in concern and is the same as the data in the main storage).

When any one of processor modules issues a read request and the data is not stored in the cache memory of this processor module (read miss), a Read Request Tx (Transaction) is broadcast via the bus to the memory module (MM) and processor modules (PMs). If any one of PM cache memories hits, the data is returned from this PM to the requesting PM and at the same time the data is written in MM. If any one of PM cache memories does not hit, data is returned from MM.

If a data line in the cache memory to be replaced (already stored data is driven out in order to form an empty area in the cache memory) is Exclusive-Modified, this is reflected upon MM by sending a Write Back Tx to the bus.

SUMMARY OF THE INVENTION

It is an object of the present invention to provide a multiprocessor system capable of realizing correct cache coherency control in both bus and switch coupled multiprocessor systems.

It is another object of the present invention to provide a multiprocessor system capable of realizing correct cache coherency control without lowering system performance.

It is a further object of the present invention to provide a multiprocessor system capable of realizing correct cache coherency control without unnecessarily complicating the structure of memory modules and the like.

It is a still further object of the present invention to provide cache coherency control techniques capable of acquiring correct results even in a switch coupled multiprocessor system even if the transaction orders become different according to monitor sites.

It is still another object of the present invention to provide cache coherency control techniques capable of acquiring correct results without lowering system performance and with a simple structure of memory modules, in a bus coupled multiprocessor system which permits the occurrence of transaction disorder in each module.

Cache coherency control means, for example, guarantee of coincidence between a main storage and a cache. Transaction means, for example, a memory read request from a processor, a memory write request from a processor, a check (called a cache coherency check) request to another processor for checking the presence/absence of contents at a memory address.

With the above-described conventional techniques, some problems of data coherency may occur, for example, when Write Back Tx for data reflection from a cache memory to MM and Read Request Tx from another PM for the same data line are issued at a short time interval. As illustratively shown in FIG. 19, the following problem may occur.

(1) When Write Back Tx from PM0 and Read Request Tx from PM1 are issued at a short time interval, the transactions appear on the bus in the order of Read Request Tx of PM1>Write Back Tx of PM0.

(2) Since PM0 sends Write Back Tx to the bus, "Cache is invalid" is returned in response to Read Request Tx of PM1.

(3) MM reads the memory contents in response to the reception of Read Request Tx of PM1. Namely, MM returns to PM1 the memory contents not reflecting the contents of Write Back Tx of PM0.

(4) Since PM1 received the response that data in PM0 is invalid, it uses invalid data returned from MM.

In the above case (1) to (4), cache coherency becomes contradictory. This problem result from transaction disorder of Write Back Tx of PM and Read Request Tx of another PM in PMs.

A first approach to solving the above problem is as follows. It is checked by all means before the issue of Write Back Tx as to whether Read Request Tx to the same address is not on the bus. If there is Read Request Tx, a process similar to an ordinary "Exclusive-Modified" hit is performed without issuing Write Back Tx. It is obvious to ensure that the transaction disorder can be prevented in the above manner.

As a second approach, an improved control scheme has been proposed as described, for example, in the publication of JP-A-7-281956. With this approach, the transaction order of Read Request Tx and Write Back Tx on the bus is stored. Specifically, PM and MM are each provided with a queue in which the order of transactions on the bus is stored. In accordance with this order, a transaction disorder is detected.

In a memory controller in particular, the latest issued cache write and the latest issued coherent read are compared to check any possibility of conflict, and if necessary to rearrange the order of transactions and store coherent image of the memory.

The first approach is, however, associated with a technical issue that the system performance is lowered, as suggested in the publication of JP-A-7-281956. The second approach is also associated with a technical issue that the structure of each module, particularly a memory module, becomes complicated.

The first and second approaches cannot be used with a switch, such as crossbar switch, coupled system with a transaction order being different at each monitor site. For example, in a switch coupled system illustratively shown in FIG. 11, consider the case that a memory access by one PM is broadcast to other modules to allow them to monitor its access and ensure cache coherency. In this case, even if PM1 issues Write Back Tx after confirming that Read Request Tx of PM0 is not received, as with the first approach, Read Request Tx may reach thereafter in the transaction order of Write Back>Read. On the memory module side, there is a possibility of the transaction order of Read>Write Back. In this case, there is also a possibility that Write Back Tx of PM1 may reach after the memory contents are returned to PM0. Therefore, cache coherency becomes contradictory. Obviously, the second approach storing the transaction issue order on a bus cannot be applied to a switch coupled system.

The objects of the invention are to solve these problems.

According to the present invention, a notifying unit is provided for returning a completion of a memory write request issued to a memory module, back to the requested module. The notifying unit may be provided in a memory module or in a crossbar switch of a crossbar switch coupled system.

A unit is provided for inquiring and responding whether read data is present in the cache memory of another processor module among a plurality of processor modules, and a unit is provided for collecting the response contents.

Provided in each processor module is a discriminating unit for discriminating the state that some data line of the cache memory is in the form of "Exclusive-Modified and during the execution of Write Back". Write Back means a state after a transaction is issued to the memory and before the completion acknowledgment is received.

The provision of the notifying unit allows each processor module to correctly recognize a timing which ensures the reflection of the write request upon the memory module.

The provision of the inquiring unit allows each processor module to correctly recognize: the module which supplied read data and its state; a correct timing of data read from the memory module; whether read data is correct or not in the speculated data read in which a read request to the memory module and an inquiry to another processor module as to whether there is read data are both performed at the same time; and other information.

The provision of the dis-criminating unit allows the second means to correctly control: the type of the state of a cache memory responding to another processor module; and a response timing.

According to a multiprocessor system of this invention, it is possible to realize correct cache coherency control in both bus and switch coupled multiprocessor systems.

According to the multiprocessor system of this invention, it is possible to realize correct cache coherency control without lowering system performance.

According to the multiprocessor system of this invention, it is possible to realize correct cache coherency control without unnecessarily complicating the structure of memory modules and the like.

According to a cache coherency control method of this invention, it is possible to acquire correct results even in a switch coupled multiprocessor system in which the transaction order becomes different depending on a monitor site.

According to the cache coherency control method of this invention, it is possible to acquire correct results without lowering system performance and with a simple structure of memory modules, in a bus coupled multiprocessor system which permits the occurrence of transaction disorder in each module.

BRIEF DESCRIPTION OF THE DRAWINGS

FIG. 8 is a timing chart illustrating an example of the operation of the multiprocessor system and the cache coherence control method according to the embodiment of the invention.

FIG. 9 is a timing chart illustrating another example of the operation of the multiprocessor system and the cache coherence control method according to the embodiment of the invention.

FIG. 10 is a timing chart illustrating another example of the operation of the multiprocessor system and the cache coherence control method according to the embodiment of the invention.

FIG. 11 is a timing chart explaining an example of a technical issue associated with a conventional switch coupled multiprocessor system and a conventional cache coherency control method.

FIG. 12 is a timing chart illustrating an example of the operation of a speculated READ request issue scheme used with the multiprocessor system and the cache coherency control method according to the embodiment of the invention.

FIG. 13 is a timing chart illustrating another example of the operation of a speculated READ request issue scheme used with the multiprocessor system and the cache coherency control method according to the embodiment of the invention.

FIG. 19 is a timing chart explaining an example of a technical issue associated with a conventional bus coupled multiprocessor system and a conventional cache coherency control method.

DETAILED DESCRIPTION OF THE PREFERRED EMBODIMENTS

Figure 1:
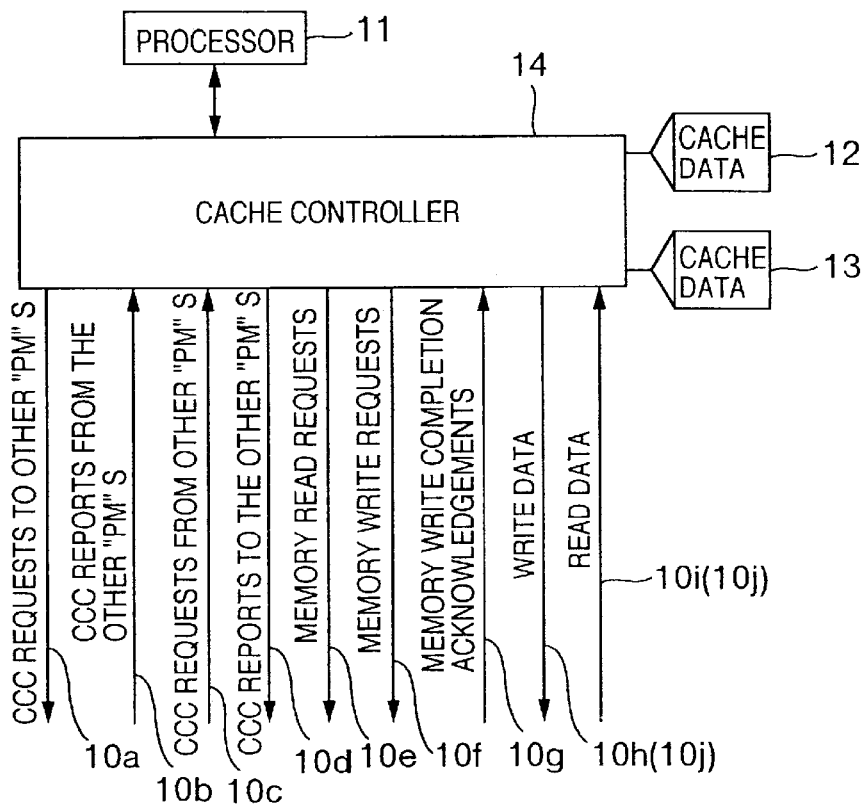
FIG. 1 is a conceptual diagram illustrating an example of control information used by a multiprocessor system and a cache coherency control method according to an embodiment of the invention.
Figure 2:
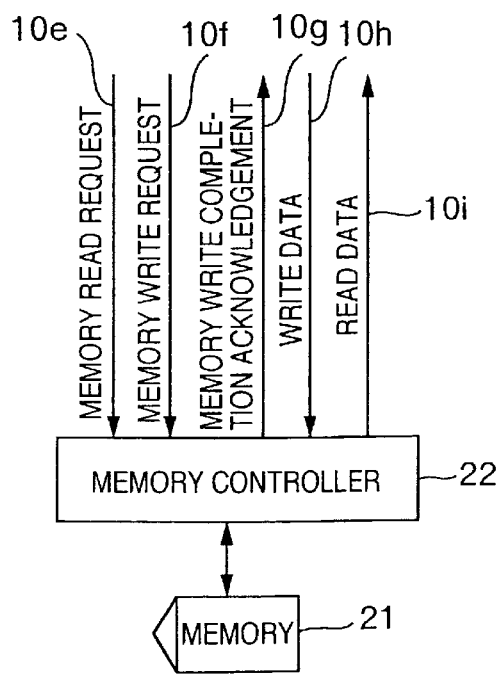
FIG. 2 is a conceptual diagram illustrating an example of control information used with the multiprocessor system and the cache coherency control method according to the embodiment of the invention.
Figure 3:
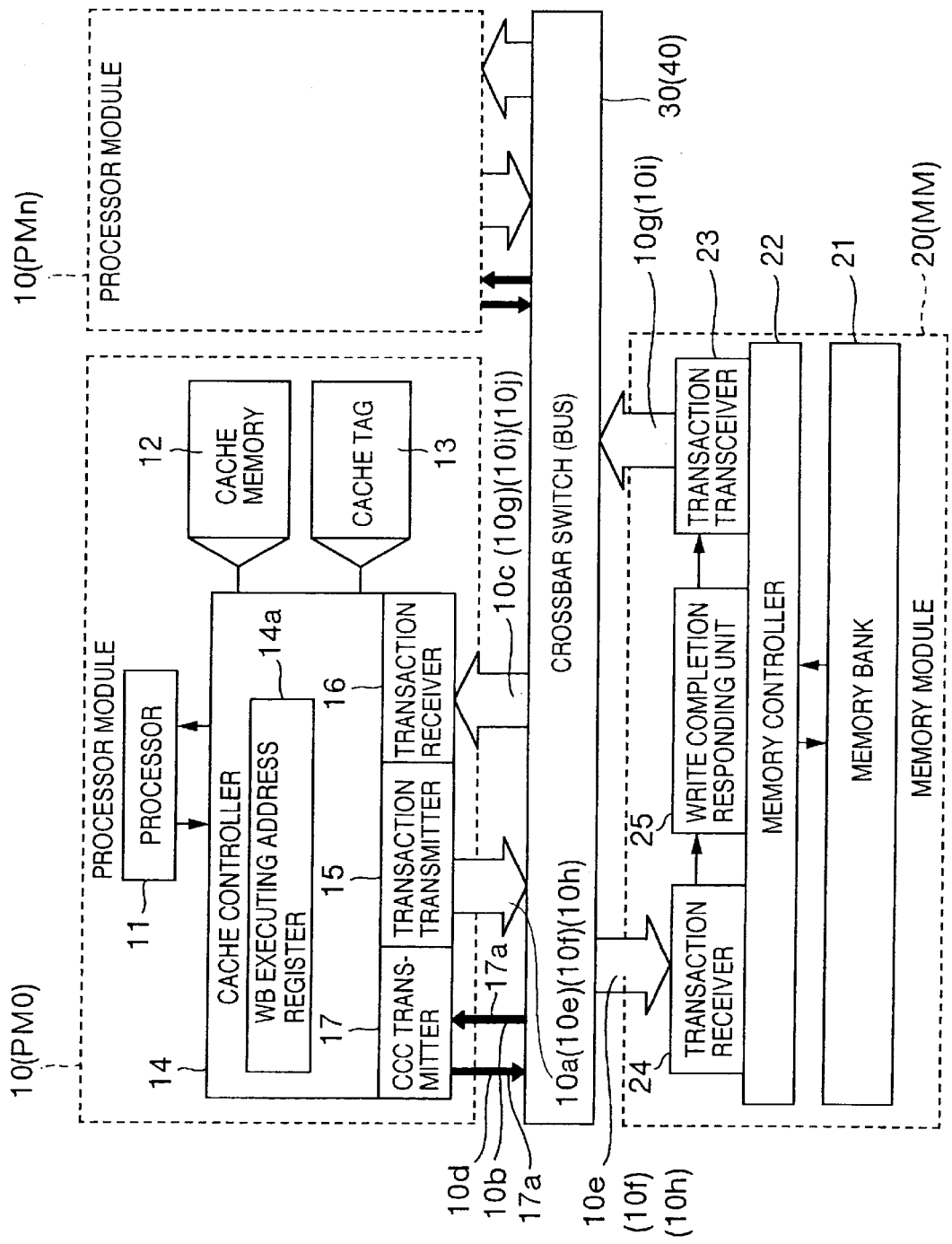
FIG. 3 is a conceptual diagram illustrating the details of examples of a processor module and a memory module of the multiprocessor system according to the embodiment of the invention.
Figure 4:
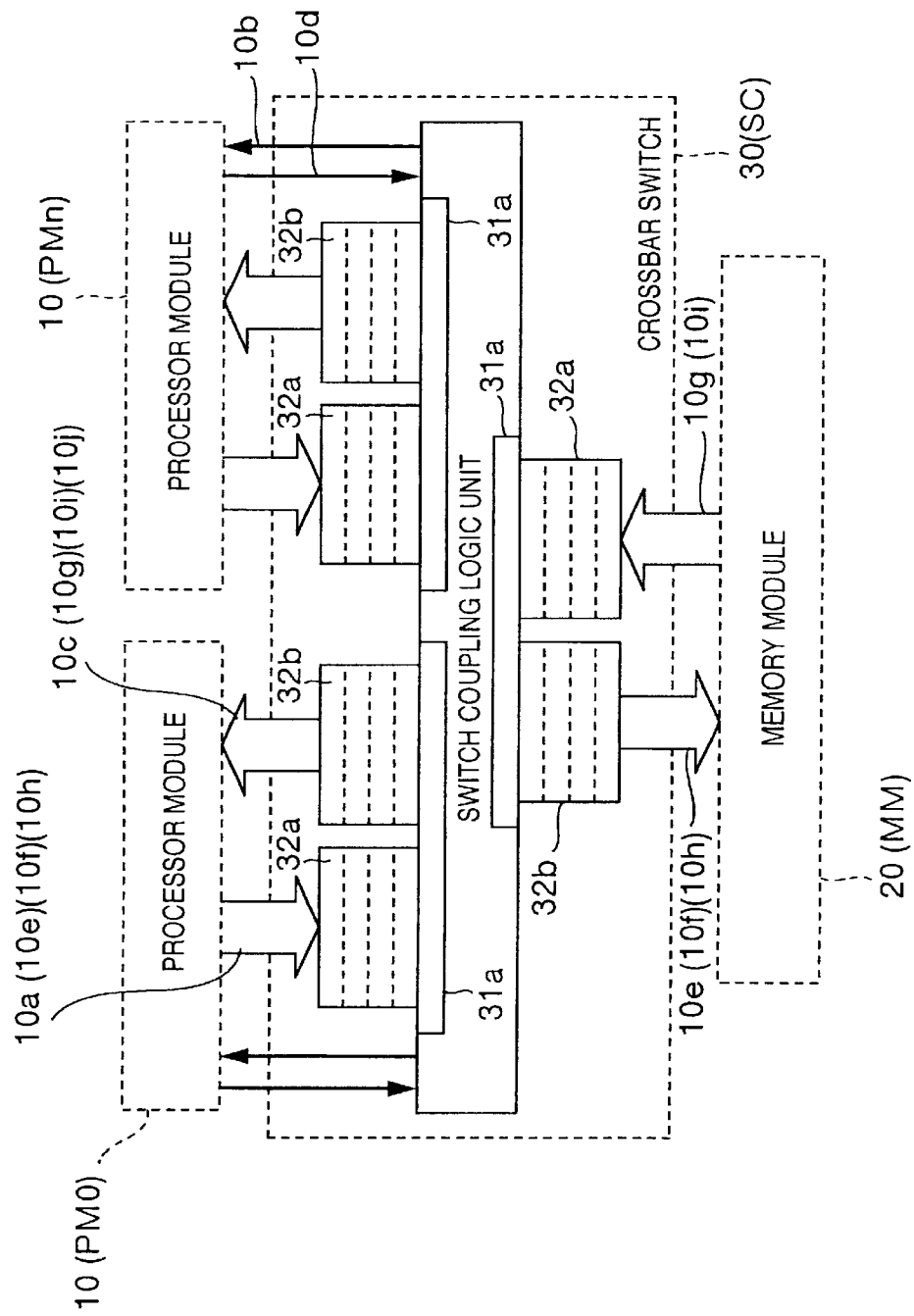
FIG. 4 is a conceptual diagram illustrating the details of an example of the structure of a crossbar switch of the multiprocessor system according to the embodiment of the invention.

Preferred embodiments of the invention will be described with reference to the accompanying drawings.
(First Embodiment)
FIGS. 1 and 2 are conceptual diagrams illustrating examples of control information used with a multiprocessor system and a cache coherence control method according to an embodiment of the invention. FIGS. 3 and 4 are conceptual diagrams illustrating examples of the structure of the multiprocessor system of the embodiment, and FIG. 5 is a conceptual diagram illustrating an example of the overall structure of the multiprocessor system of the embodiment.

Figure 5:
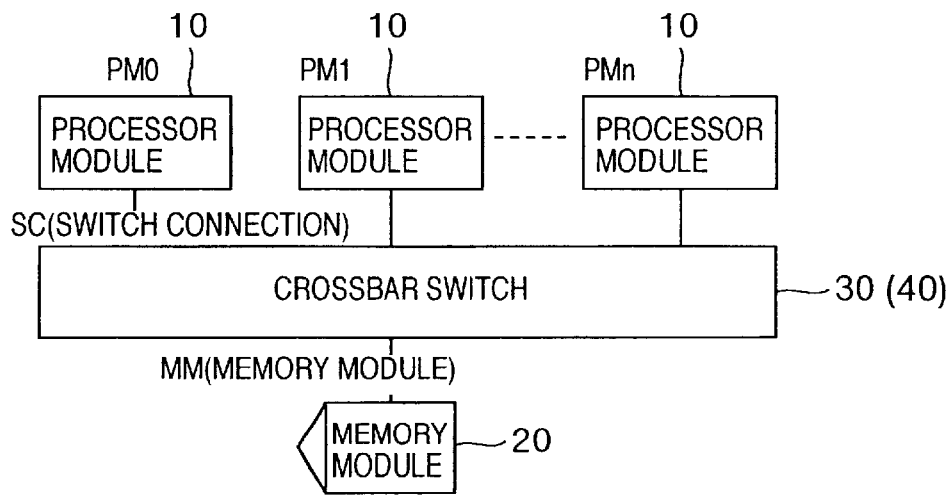
FIG. 5 is a conceptual diagram illustrating the details of an example of the overall structure of the multiprocessor system according to the embodiment of the invention.

As illustratively shown in FIG. 5, the multiprocessor system of this embodiment has a plurality of processor modules PM0 to PMn 10 and at least one memory module MM 20 interconnected by a crossbar switch 30. The memory module MM is used in common by the plurality of processor modules PM0 to PMn, constituting a so-called tightly coupled multiprocessor system.

As illustratively shown in FIG. 3, each processor module 10 is constituted of a processor 11, a cache memory 12, a caching tag 13, a cache controller 14, a transaction transmitter 15, a transaction receiver 16 and a cache coherency check (CCC) transceiver 17. The processor 11 is made of, for example, a general microprocessor. The cache memory 12 temporarily stores data transferred between the processor 11 and an external circuit of the processor module 10. The cache controller 14 controls the cache memory 12 in accordance with control information set in the cache tag 13. The transaction transmitter 15, receiver 16 and CCC transceiver 17 transfer information to and from another module via a crossbar switch 30.

For the execution of Write Back to reflect any data (cache line) in the cache memory 12 upon the main module 20, a WB executing address register 14a is provided in the cache controller 14. This register 14a stores the address of each cache line during the execution of Write Back, the address being set at the start of a Write Back transaction and cleared when a memory write completion acknowledgement 10g (WRITE_ACK) to be described later is received. If there is an inquiry by another processor module PM as to whether a cache line is used for Write Back, the inquired processor module can correctly know the completion timing of Write Back of the cache line by referring to the WB executing address register (discriminating means) 14a.

The memory module 20 (MM) is constituted of a memory bank 21 as data storing media, a memory controller 22 for controlling the memory bank 21, a transaction transmitter 23, a transaction receiver 24, and a write completion responding unit (notifying means) 25. The transaction transmitter 23 and receiver 24 transfer information to and from an arbitrary external processor module PM0 to PMn via the crossbar switch 30.

As illustratively shown in FIG. 4, the crossbar switch 30 is constituted of: a switch coupling logic unit 31 for switching between ports 31a connected to respective modules to perform a 1:1 or 1: multiple (broadcast) connection control of respective modules; and a pair of transaction queues 32a and 32b provided at each of the input and output sides of each port 31a.

As illustratively shown in FIG. 1, information to be transferred between each processor module 10 (PM0 to PMn) and the external circuit includes: a CCC request 10a (CCC_REQ_TO) issued to other PMs for the inquiry of a presence/absence of read data if the read data is not present in its own memory cache 12; a CCC report 10b (CCC_REP_FROM) received from the other PMs in response to the CCC request 10a; a CCC request 10c (CCC_REQ_FROM) received from other PMs; a CCC report 10d (CCC_REP_TO) returned to the other PMs in response to the CCC request 10c; and information to be transferred to and from the memory module 20 including: a memory read request 10e (READ); a memory write request 10f (WRITE); a memory write completion acknowledgement 10g (WRITE-ACK); write data 10h (Data); and read data 10i (Data). Also included is read data 10j as a cache line returned from the cache memory 12 of another processor module PM in response to the CCC request 10a. The read and write data 10h, 10i and 10j are drawn with one arrow in FIG. 1 for the simplicity thereof.

As illustratively shown in FIG. 2, information to be transferred between the memory module 20 and processor module 10 includes: the memory read request 10e (READ); memory write request 10f (WRITE); memory write completion acknowledgement 10g (WRITE_ACK); write data 10h (Data); and read data 10i (Data).

In this embodiment, of the above sets of information, the CCC request 10a (CCC_REQ_TO), CCC request 10c (CCC_REQ_FROM): memory read request 10e (READ), memory write request 10f (WRITE), memory write completion acknowledgement 10g (WRITE_ACK), write data 10h (Date) and read data 10i (Data) are transferred, as transactions of various types illustratively shown in FIGS. 6A and 6B and FIGS. 7A to 7C to be later described, time sequentially in the issue order, to and from other destination modules via the transaction transmitter 15, transaction receiver 16, transaction transmitter 23 and transaction receiver 24, by using unrepresented switching logic of the crossbar switch 30.

The other CCC reports 10b (CCC_REP_FROM) and 10d (CCC_REP_TO) are transferred between the processor modules PM0 to PMn via the CCC transceiver 17 and dedicated communication lines 17a. The CCC reports 10b and 10d may be defined as one type of the transactions illustratively shown in FIGS. 6A and 6B and FIGS. 7A to 7C.

The CCC report 10b (10d) is classified in this embodiment into the following five types.

"INV": Data (cache line) requested by CCC_REQ_FROM is invalid in this PM.

"SUP": A cache line requested by CCC_REQ_FROM is present in this cache memory 12 as "Exclusive-Modified", the data is supplied to the requesting processor module, and the supplied cache line is made invalid. The requesting PM deals the received cache line as "Exclusive-Modified".

"SHR": Data (cache line) requested by CCC_REQ_FROM is Shared-Unmodified in this PM.

"RR": Since data read from the memory module MM is possibly invalid data (stale data), reread (ReRead) of this data again is urged to the CCC_REQ_FROM requesting module.

"RRP": Since data read from the memory module MM is possibly invalid data (stale data), ReRead Proxy of this data is executed by this PM on behalf of the requesting module. The read data is supplied to the requesting module directly from the memory module MM.

Next, the types of transactions used with this embodiment will be described with reference to FIGS. 6A and 6B and FIGS. 7A to 7C.

Figure 6A:
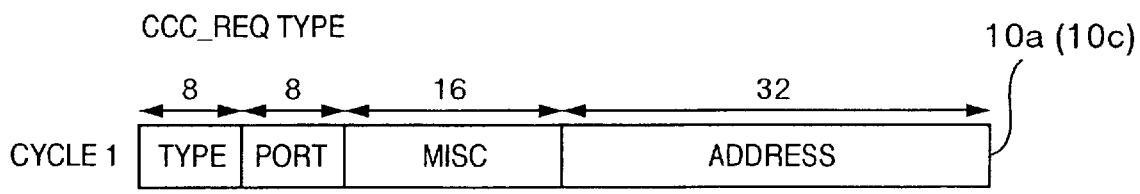
FIGS. 6A and 6B are conceptual diagrams showing examples of the structure of a transaction used with the multiprocessor system according to the embodiment of the invention.

FIG. 6A shows a transaction (CCC_REQ) to be used for the CCC request 10a (10c). This transaction is generated by the transaction transmitter 15. Set to a TYPE field of 8-bit width is a bit pattern indicating that this transaction is CCC_REQ. Set to the next PORT field of 8-bit width is a specific bit pattern indicating destination information that this transaction is broadcast at the same time to all other processor modules. Set to the next MISC field of 16-bit width is the information used when the transaction is processed at the destination, this information being set when necessary. In this embodiment, for example, identification information such as a port number of the requesting processor module PM is set and used for determining the destination to which CCC_REP_TO is transmitted in response to this CCC_REQ. Set to the remaining ADDRESS field of 32-bit width is an address of a cache line of the memory module MM to be inquired by CCC_REQ.

Figure 6B:
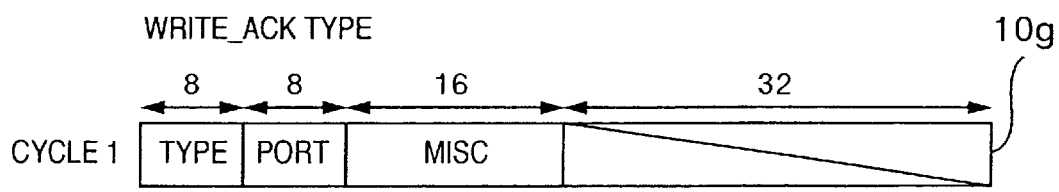

FIG. 6B is a WRITE_ACK transaction which is returned from the memory module MM to the processor module which issued the memory write request 10f. Set to the TYPE field is a specific bit pattern indicating that this transaction is WRITE-ACK. The PORT field is set with the port number of the processor module to which an acknowledgement is returned. The MISC field is set with, for example, the port number of the memory module MM. The remaining field of 32-bit width is not used. A write request address may be set to this non-used 32-bit field to allow the requesting module to check completion of a plurality of write requests.

In this embodiment, this WRITE_ACK transaction is generated by the write completion responding unit 25 of the memory module 20. This transaction is generated when arrival of a WRITE transaction to be later described at an unrepresented transaction queue of the transaction receiver 24 is detected. The generated WRITE_ACK transaction is added to an unrepresented transaction queue of the transaction transmitter 23 and transmitted to the destination. Since a READ transaction to the memory module MM is processed always by time sequentially adding it to the transaction queue of the transaction receiver 24, any contradiction will not occur even if the WRITE_ACK transaction is responded at the above-described timing before the write data is actually written in the memory bank 21.

Figure 7A:
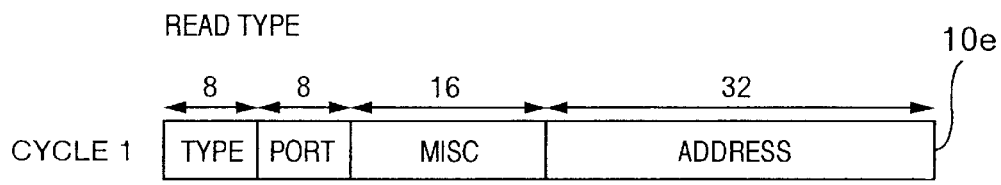
FIGS. 7A, 7B and 7C are conceptual diagrams showing examples of the structure of a transaction used with the multiprocessor system according to the embodiment of the invention.

FIG. 7A shows a transaction to be used by the memory read request 10e (READ). The TYPE field is set with a specific bit pattern representative of the READ transaction, the PORT field is set with the port number of the requested memory module MM, the MISC field is set with the port number of the READ requesting processor module PM, and the ADDRESS field is set with the address of data to be read.

Figure 7B:
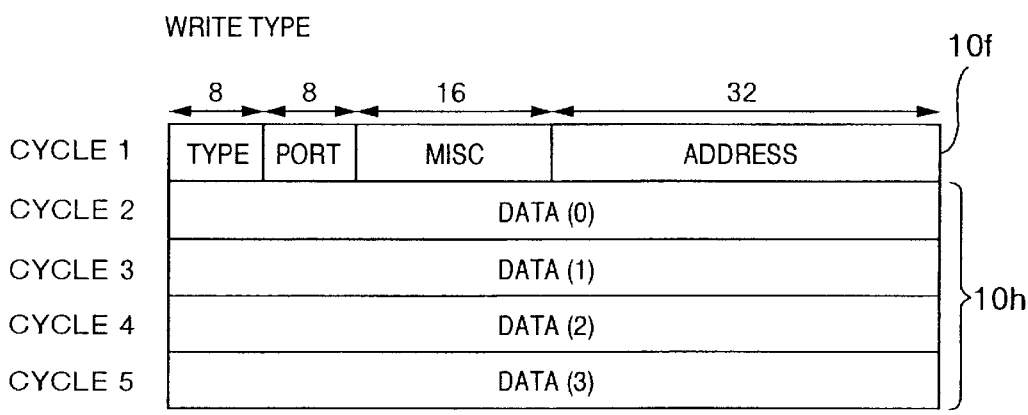

FIG. 7B shows a transaction to be used by the memory write request 10f (WRITE). The TYPE field is set with a specific bit pattern representative of the WRITE transaction, the PORT field is set with the port number of the requested memory module MM, the MISC field is set with the port number of the WRITE requesting processor module PM and with parameters such as the length (cycle number) of succeeding write data, and the ADDRESS field is set with the address of data to be written. The port number of the WRITE requesting processor module PM set to the MISC field is referred to by the write completion responding unit 25 when the WRITE_ACK transaction is generated.

Figure 7C:
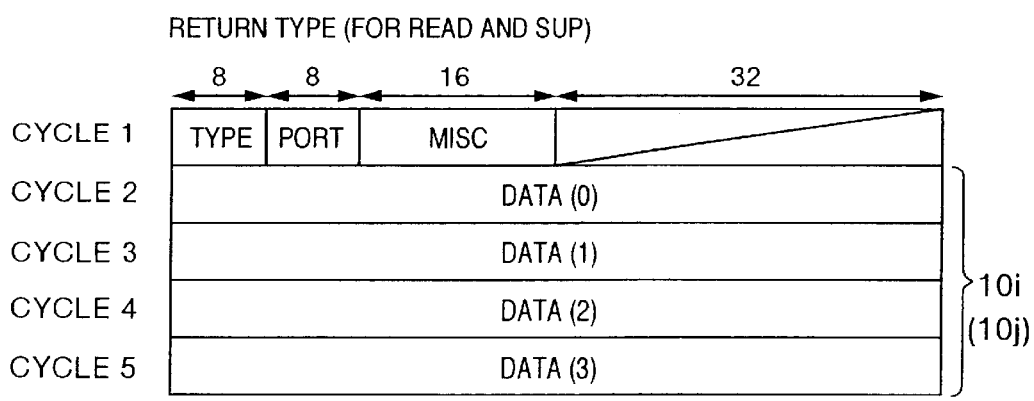

FIG. 7C shows a RETURN transaction to be used for returning the read data 10i, 10j to the requesting module. This transaction for the read data 10i (10j) is generated by the transaction transmitter 23 (transaction transmitter 15 of each processor module PM).

The TYPE field is set with a specific pattern representative of the RETURN transaction, the PORT field is set with the port number of the destination (READ requesting) processor module PM, the MISC field is set with, for example, the information for discriminating between the read data 10i by READ and the read data 10j by SUP and parameters such as the data length (cycle number) to be returned.

Information transfer between modules is performed basically by time sequentially sending to, and receiving from, the crossbar switch 30 a data unit (transaction) of 64-bit width illustrated in FIGS. 6A and 6B and FIGS. 7A to 7C synchronously with an operation cycle unit of the crossbar switch 30.

With reference to the timing charts shown in FIGS. 8 to 16, examples of the operation of the multiprocessor system and the cache coherency control method according to the embodiment of this invention will be described. Modules to be operated are disposed in the ordinate direction, and the abscissa direction is a time axis of the operation of each module.

(First Case)

With reference to FIGS. 8 to 10 and FIG. 11, a general READ request issue method of issuing a READ request after the confirmation operation by issuing CCC_REQ will be described while comparing with conventional techniques.

FIG. 8: [All miss>Use of data from MM]

In a READ request process at an arbitrary processor module PM0, when it is judged (Miss) that subject data (cache line) is not present in its cache memory 12, PM0 generates a transaction of the type of FIG. 6A and broadcasts CCC_REQ to all other PM1 to PMn.

Since the requested cache line is not present (INVALID) in the cache memory 12 of each of the other modules PM1 to PMn which received CCC_REQ, "INV" is returned as the CCC report 10d (CCC_REP) to the requesting PM0.

Upon reception of the CCC report 10b, the requesting PM0 issues the READ transaction of the type of FIG. 7A to MM, and obtains the target read data by the RETURN transaction of FIG. 7C.

FIG. 9: [Dirty hit>Supply of cache line from PM]

In a READ request process at an optional processor module PM0, when it is judged (Miss) that a subject cache line is not present in its cache memory 12, PM0 broadcasts CCC_REQ to all other modules PM1 to PMn.

The requested cache line is present in the form of "Exclusive-Modified" in the cache memory 12 of PM1 which received CCC_REQ. After it is confirmed from the cleared WB executing address register 14a that the write-back is not under execution, "SUP" (supply) is returned as the CCC report 10d (CCC_REP) to the requesting PM0 and the subject cache line is transmitted to the requesting PM0 by generating the transaction of the RETURN type of FIG. 7C.

Since the requested cache line is not present (INVALID) in the cache memory 12 of other modules PMn which received CCC_REQ, "INV" is returned as the CCC report 10d (CCC_REP) to the requesting PM0.

The requesting module PM0 collects CCC reports 10b from modules PM1 to PMn and determines to use the data of the RETURN transaction transmitted from PM1.

FIG. 10: [Dirty hit upon data during execution of write-back . . . After confirming write-back completion, CCC report is transmitted to retain coherency]

In a READ request process at an optional processor module PM0, when it is judged (Miss) that subject data (cache line) is not present in its cache memory 12, PM0 broadcasts CCC_REQ to all other modules PM1 to PMn.

The requested cache line is present in the form of "Exclusive-Modified" in the cache memory 12 of PM1 which received CCC_REQ and is under execution of write-back, and it is confirmed, from the contents of the WB executing address register 14a being coincident with the address of the requested cache line, that the requested cache line is under execution of write-back. In this case, PM1 waits for arrival of the WRITE_ACK transaction of FIG. 6B from MM, and after the confirmation of completion of reflection operation of the cache line upon MM, "INV" is returned as the CCC report 10d (CCC_REP) to the requesting PM0 and the target cache line in the cache memory 12 is invalidated.

Since the requested cache line is not present (INVALID) in the cache memory 12 of other modules PMn which received CCC_REQ, "INV" is returned as the CCC report 10d (CCC_REP) to the requesting PM0.

MM which processes the write-back from PM1 returns the WRITE_ACK transaction back to PM1 when the WRITE transaction for the write-back is queued in the transaction receiver 24.

Finally, the requesting module PM0 collects CCC reports 10b from modules PM1 to PMn. Since all the reports are "INV", a READ request is issued to MM and the data returned by the RETURN transaction is used. In this embodiment, since the write-back data of PM is reflected upon MM when the READ request is issued from PM0 to MM, PM0 can obtain latest data from MM without any contradiction.

FIG. 11: [Without write-back completion acknowledgement as conventional, PM0 cannot obtain correct data depending upon transaction reception order at MM]

If PM cannot know the completion timing of a Write Back issued by PM, as in conventional techniques, and if CCC_REQ is received at the timing shown in FIG. 11 during execution of the write-back of PM1, PM1 transmits "INV" irrespective of whether the write-back operation was completed or not. Therefore, PM0 may read from MM old and invalid (STALE) data not reflecting the contents of the write-back.

(2nd Case)

With reference to FIGS. 12 to 15, a speculative READ request issue method of issuing both a CCC_REQ and a speculated fetch request to MM generally simultaneously will be described.

FIG. 12: [All miss>Use of data from MM (hit of speculated fetch)]

In a READ request process at an arbitrary processor module PM0, when it is judged (Miss) that a target cache line is not present in its cache memory 12, PM0 broadcasts CCC_REQ to all other modules PM1 to PMn at the same time and issues a speculative fetch request (READ) to MM.

Since the requested cache line is not present (INVALID) in the cache memory 12 of each of the other modules PM1 to PMn which received CCC_REQ, "INV" is returned as the CCC report 10d (CCC_REP) to the requesting PM0.

MM responds to the READ request from PM0 and returns read data.

The requesting module PM0 collects "INV" returned as CCC reports 10d from modules PM1 to PMn and confirms that all PMs were cache miss and the read data returned from MM is used.

As compared with FIG. 8, in the operations illustrated in FIG. 12, the speculative READ request is issued at an earlier stage so that the time required for obtaining read data from MM can be shortened.

FIG. 13: [Dirty hit>Supply of cache line from PM, discarding data from MM (speculative fetch miss)]

In a READ request process at an arbitrary processor module PM0, when it is judged (Miss) that a target cache line is not present in its cache memory 12, PM0 broadcasts CCC_REQ to all other modules PM1 to PMn and at the same time issues a speculative fetch request (READ) to MM.

The requested cache line is present in the form of "Exclusive-Modified" in the cache memory 12 of PM1 which received CCC_REQ. After it is confirmed from the cleared WB executing address register 14a that the write-back is not under execution, "SUP" (supply) is returned as the CCC report 10d (CCC_REP) to the requesting PM0 and the subject cache line is transmitted to the requesting PM0 by generating the transaction of the RETURN type of FIG. 7C.

Since the requested cache line is not present (INVALID) in the cache memory 12 of other modules PMn which received CCC_REQ, "INV" is returned as the CCC report 10d (CCC_REP) to the requesting PM0.

MM responds to the READ request issued from PM0 and returns read data.

The requesting module PM0 collects CCC reports 10b from modules PM1 to PMn and determines to use the data of the RETURN transaction transmitted from PM1.

Figure 14:
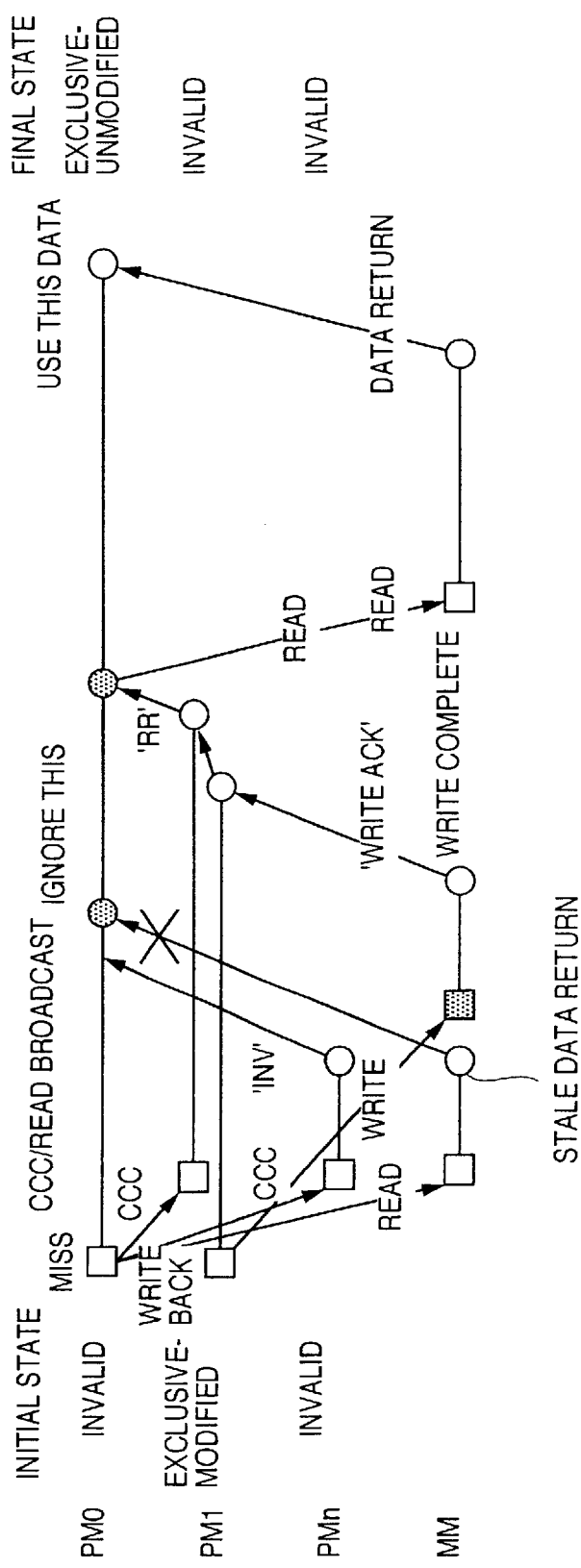
FIG. 14 is a timing chart illustrating another example of the operation of a speculated READ request issue scheme used with the multiprocessor system and the cache coherency control method according to the embodiment of the invention.

FIG. 14: [(1) Dirty hit during execution of write-back>After confirming write-back completion, CCC report is transmitted to notify a requesting module of a fetch miss and urge reread]

In a READ request process at an optional processor module PM0, when it is judged (Miss) that subject data (cache line) is not present in its cache memory 12, PM0 broadcasts CCC_REQ to all other modules PM1 to PMn and issues a speculative fetch request (READ) to MM.

The requested cache line is present in the form of "Exclusive-Modified" in the cache memory 12 of PM1 which received CCC_REQ and is under execution of write-back, and it is confirmed, from the contents of the WB executing address register 14a being coincident with the address of the requested cache line, that the requested cache line is under execution of write-back. In this case, PM1 waits for arrival of the WRITE_ACK transaction of FIG. 6B from MM, and after the confirmation of completion of reflection operation of the cache line upon MM, "RR" is returned as the CCC report 10d (CCC_REP) to the requesting PM0 to urge a reread and the target cache line in the cache memory 12 is invalidated.

Since the requested cache line is not present (INVALID) in the cache memory 12 of other modules PMn which received CCC_REQ, "INV" is returned as the CCC report 10d (CCC_REP) to the requesting PM0.

In the example shown in FIG. 14, the speculative READ transaction from PM0 arrives first at MM which in turn returns old and invalid (STALE) data. Thereafter, the Write Back transaction from PM1 arrives at MM which returns a WRITE_ACK transaction back to the requesting PM1 when the WRITE transaction for the writeback is queued in the transaction receiver 24.

In the example shown in FIG. 14, "INV" returned from PMn, the invalid data returned from MM, and "RR" returned from PM1 arrive in this order at the CCC_REQ requesting PM0. This requesting module PM0 collects these CCC reports to discard the already arrived invalid read data and issues again a Read request to MM in accordance with "RR" returned from PM1 to thereby obtain correct latest data.

As above, even if the speculated fetch request and the processes of CCC_REQ and write-back execution are mixed, PM0 can obtain correct data from MM without any contradiction. The reason of this is as follows. In this embodiment, PM1 executing write-back confirms securely the write-back completion of MM and thereafter urges the requesting PM0 to issue a ReRead request. The reflection of write-back data from PM1 upon MM can therefore be ensured when PM0 issues the ReRead request to MM.

Figure 15:
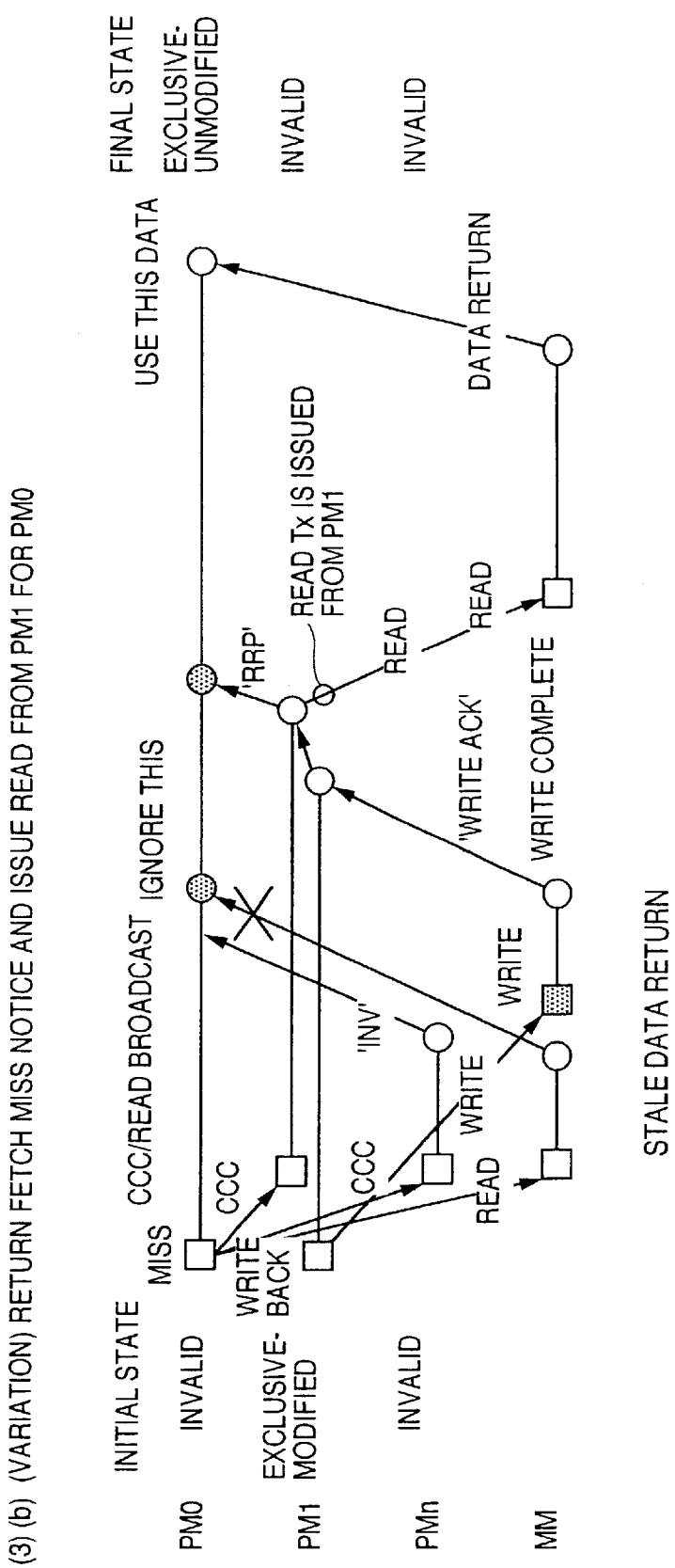
FIG. 15 is a timing chart illustrating another example of the operation of a speculated READ request issue scheme used with the multiprocessor system and the cache coherency control method according to the embodiment of the invention.

FIG. 15: [(2) Dirty hit during execution of write-back>After confirming write-back completion, CCC report is transmitted to notify a requesting module of a fetch miss and execute a reread on behalf of the requesting module]

The process shown in FIG. 15 is a modification of the process shown in FIG. 14. The following point is difference from the process shown in FIG. 14. PM1 which confirmed a write-back completion returns "RRP" (Re-Read Proxy) in response to CCC_REQ from the requesting PM0. "RRP" indicates that PM1 issued a specific READ request to MM as a proxy to PM1 to supply the RETURN transaction to PM0. Upon reception of this "RRP", the requesting PM0 discards the invalid data already arrived from MM and waits for correct latest data from MM to use it.

Figure 16:
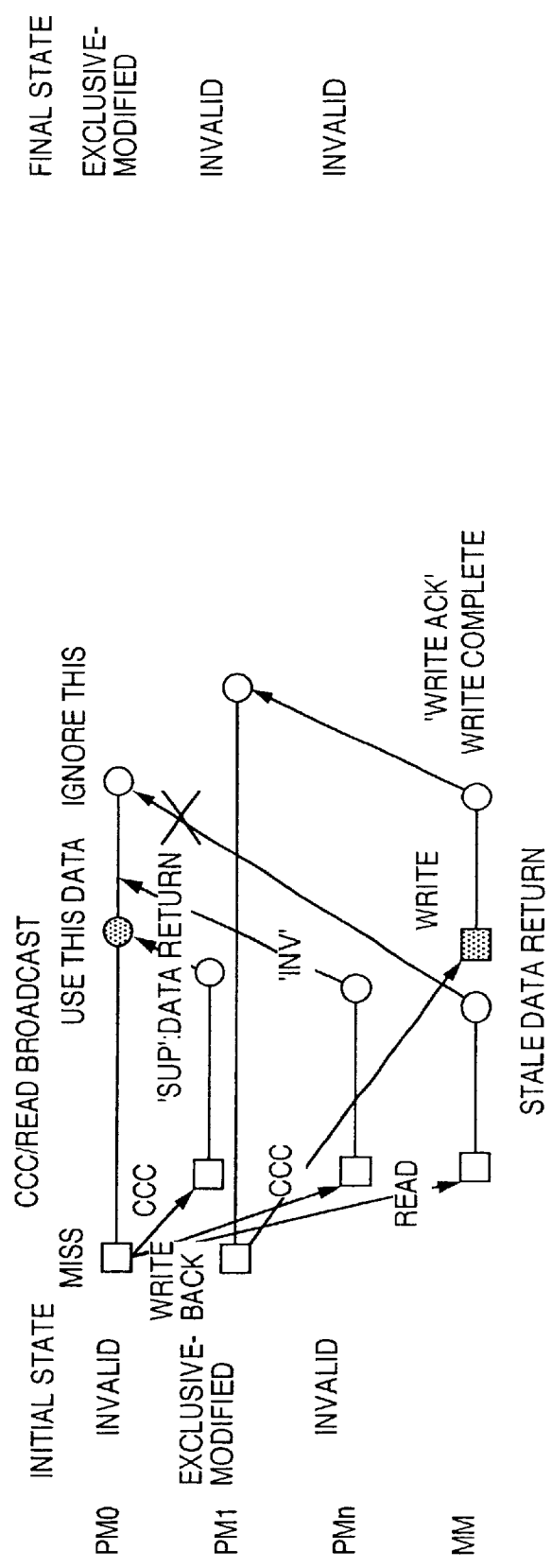
FIG. 16 is a timing chart illustrating a modification of the operation of a speculated READ request issue scheme used with the multiprocessor system and the cache coherency control method according to the embodiment of the invention.

FIG. 16: [(3) Dirty hit during execution of write-back>Supply of data on cache line]

The different points of the process shown in FIG. 16 from the processes shown in FIGS. 14 and 15 are as follows. If the cache line of PM1 during execution of write-back is dirty-hit, "SUP" is returned in response to CCC_REQ issued from PM0 to supply the hit cache line from PM1, whereas the data obtained by the speculative READ request issued by the requesting PM0 at the same time when CCC_REQ was issued, is discarded.

In the example shown in FIG. 16, immediately after the cache line of PM1 under execution of write-back is found to be dirty-hit, the cache line is supplied to the requesting PM0. Therefore, as compared with the requesting PM0 or proxy issuing the READ request, the time required for the requesting PM0 to obtain the subject read data can be shortened.

Figure 17:
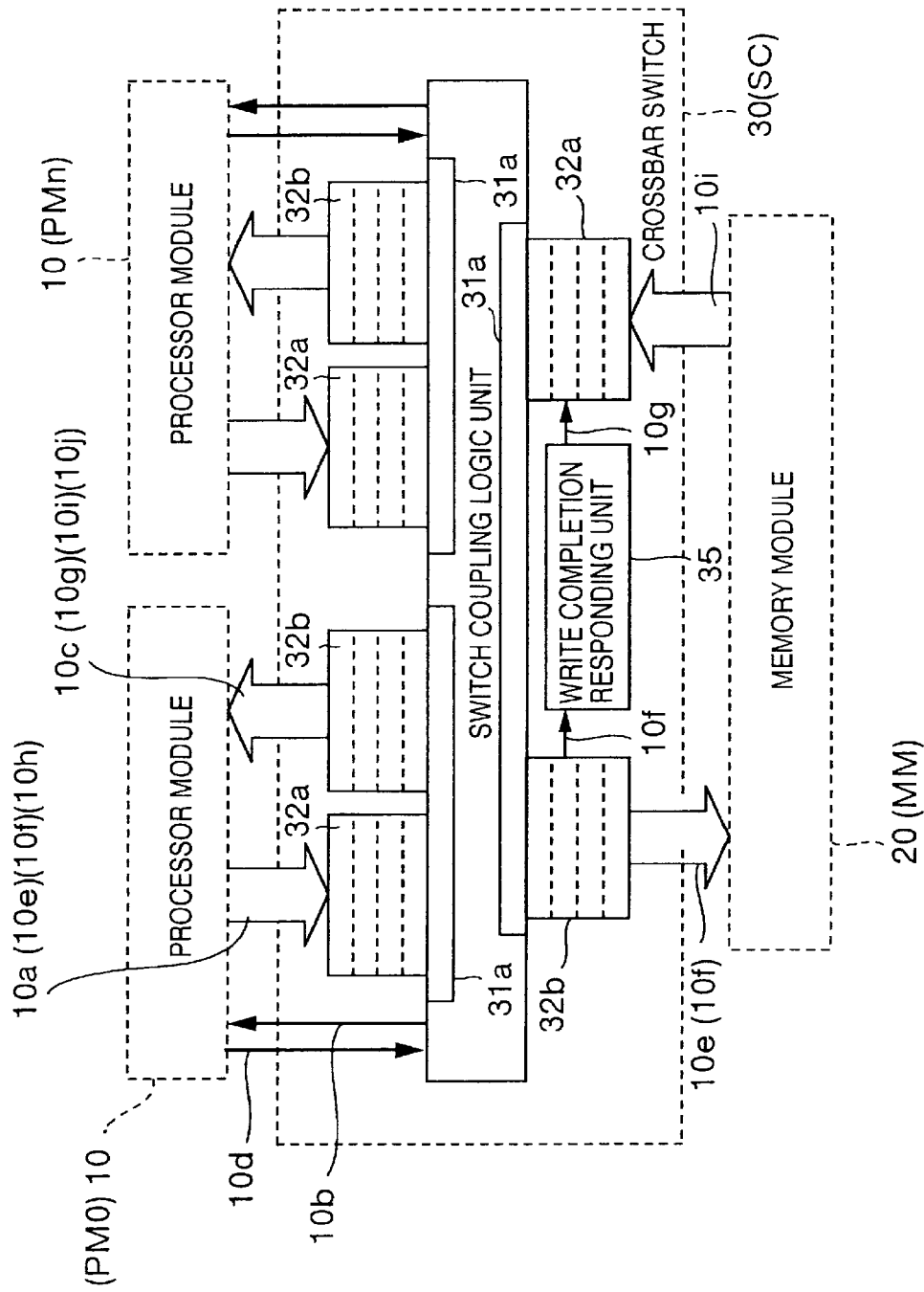
FIG. 17 is a conceptual diagram showing a modification of the multiprocessor system according to the embodiment of the invention.

Although the write completion responding unit 25 is provided in the memory module 20 as shown in FIG. 3 for realizing the method of returning the WRITE_ACK for write-back to the requesting module, it may be provided in other positions such as in a crossbar switch 30 as shown in FIG. 17.

Specifically, a write completion responding unit (notifying means) 35 is provided in the crossbar switch 30. The write completion responding unit 35 monitors an arrival of a WRITE transaction input to a memory module 20 via a transaction queue 32b at a port 31a connected to the memory module 20. When the WRITE transaction is input, a WRITE-ACK transaction is generated and queued into a transaction queue 32a through which read data from the memory module 20 passes.

WRITE transactions queued in the transaction queue 32b of the crossbar switch 30 are time sequentially sent to and processed by the memory module 20. Therefore, even if the WRITE_ACK transaction is returned to the requesting module at the timing when the WRITE transaction arrives at the transaction queue 32b, there is no contradiction of timings between data update and data read. Since the write completion responding unit 35 is provided in the crossbar switch, the structure of the memory module MM can be simplified.

As appreciated from the foregoing description, the multiprocessor system and the cache coherency control method of this embodiment can realize correct cache coherency control in a switch coupled multiprocessor system.

It is also possible to realize correct cache coherency control without lowering system performance.

Since simple logic that the WRITE_ACK transaction is returned when the WRITE transaction arrives, complicated processes such as rearranging the order of arriving transactions are not necessary. It is therefore possible to realize correct cache coherency control without unnecessarily complicating the structure of memory modules and the like.

Still further, it is possible to provide a cache coherency control method capable of acquiring correct results even in a switch coupled multiprocessor system such as a switch coupled multiprocessor system in which the transaction order becomes different depending on a monitor site.

(Second Embodiment)

Figure 18:
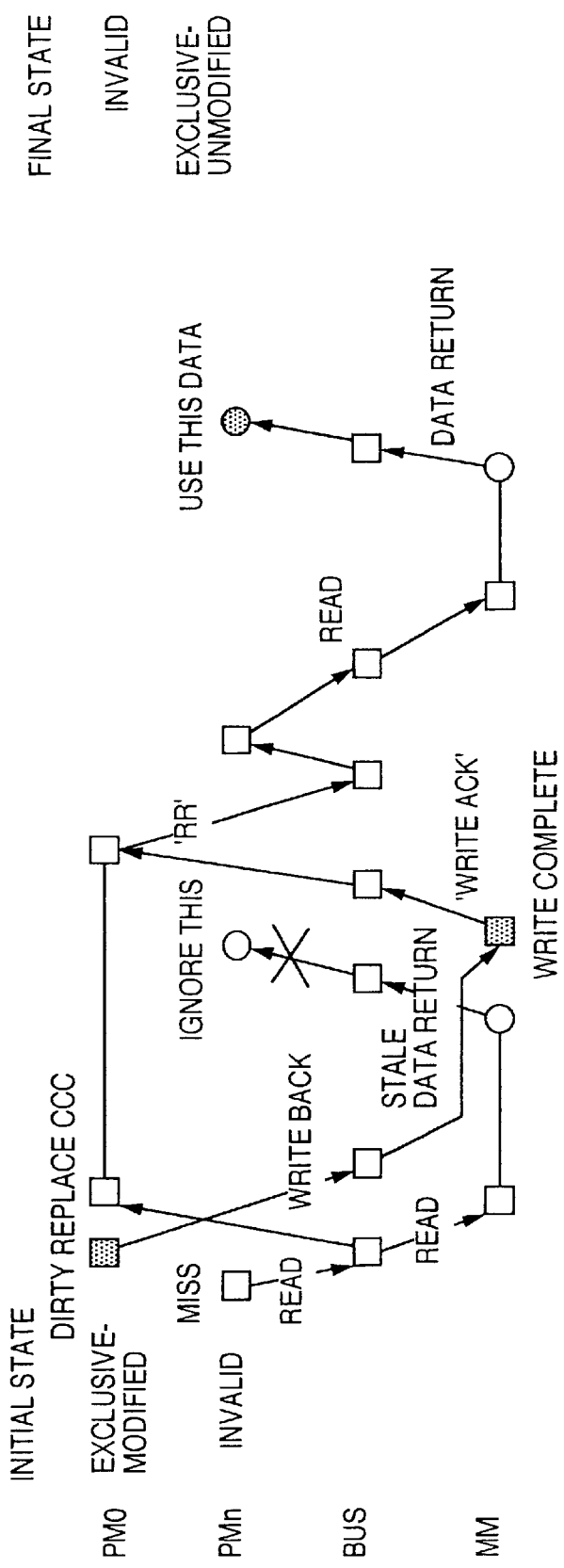
FIG. 18 is a timing chart illustrating an example of the operation of a multiprocessor system and a cache coherency control method according to another embodiment of the invention.

FIG. 18 is a timing chart illustrating an example of the operation of a multiprocessor system and a cache coherency control method according to another embodiment of the invention. In this embodiment, for example, signal transfer and cache coherency control are performed via a bus.

In this second embodiment, in place of a crossbar switch of the first embodiment shown in FIGS. 3 to 5, a bus 40 is used for sharing a memory module MM 20 by a plurality of processor modules PM0 to PMn 10. The processor modules PM0 to PMn 10 and the memory module MM 20 are similar to those of the first embodiment, and similar elements are represented by using identical reference numerals.

Referring to FIG. 18, when a cache miss occurs at PMn, a READ request to MM and CCC_REQ to another PM0 are executed via the bus 40.

It is assumed here that the requested cache line is present in the form of "Exclusive-Modified" in the PM0 which received CCC_REQ and the contents of the WB executing address register 14a are coincident with the address of the cache line. It is therefore recognized that the cache line is during execution of write-back for dirty replacement operation.

In response to the READ request from PMn, MM returns read data, thereafter executes the write-back request from PM0, and returns WRITE_ACK to PM0 when the write-back is completed. The data returned to PMn is invalid (STALE) not reflecting the write-back of PM0.

In this embodiment, PM0 which received CCC_REQ waits for WRITE_ACK for the write-back from MM, and after confirming the write-back completion, returns "RR" to the requesting PMn to urge a data reread from MM.

PMn received this "RR" discards the previous invalid (STALE) data and issues a READ transaction to MM which in turn returns a RETURN transaction whose correct latest data is used by PMn.

As above, in this second embodiment, even in a multi-processor system sharing MM via the bus 40, a WRITE_ACK transaction that MM notifies the requesting module of a write-back completion is used for the execution of a write-back request. Therefore, even if there is a fear of transaction disorder of the write-back and CCC_REQ in PM, cache coherency control can be performed without any contradiction.

The present invention made by the inventor has been described in particular in connection with the preferred embodiments. The invention is not limited only to the above embodiments, but it is apparent that various modifications can be made by those skilled in the art without departing from the scope of the invention.

What is claimed is:

1. A cache coherency control method for a multiprocessor system including a plurality of processor modules sharing at least one memory module via a bus or a crossbar switch each processor module including a cache memory for temporarily storing data to be transferred to and from the at least one memory module, the cache coherency control method comprising the steps of:

issuing an access request to updated data in said cache memory of one of the plurality of processor modules, from another processor module;

selecting at least one of first, second, third, fourth, and fifth operations in response to the access request; and executing the selected one of said first to fifth operations, wherein:

said first operation transfers updated data to the other processor module which issued the access request, if the updated data is latest updated data exclusively possessed by the one processor module and a memory write request for the updated data is not being executed;

said second operation notifies, after the completion of the memory write request, the other processor module which issued the access request that the updated data in said cache memory is invalid, if the updated data is latest updated data exclusively possessed by the one processor module and the memory write request for the updated data is under execution;

said third operation urges, after the completion of the memory write request, the other processor module which issued the access request to read the updated data from said memory module if the updated data is latest updated data exclusively possessed by the processor by the one processor module and the memory write request for the updated data is under execution;

said fourth operation issues, after the completion of the memory write request, a read request for the updated data to said memory module as a proxy to the other processor module which issued the access request to transfer the updated data from said memory module to the access requested other processor module if the updated data is latest updated data exclusively possessed by the processor module and the memory write request for the updated data is under execution; and said fifth operation supplies the updated data in the processor module to the access requested other processor module and invalidates the updated data after a completion of the memory write request, if the updated data is latest updated data exclusively possessed by the one processor module and the memory write request for the updated data is under execution.

2. A multiprocessor system comprising:

a plurality of processor modules;

a signal transmission unit connected to said plurality of processor modules, said signal transmission unit being a bus or a crossbar switch;

a memory module including a memory connected via said signal transmission unit to said plurality of processor modules, said memory module being shared by said plurality of processor modules;

a memory write request unit provided in each of said plurality of processor modules for issuing a memory write request to said memory module via said signal transmission unit;

a memory write completion notifying unit responsive to the memory write request and provided in said signal transmission unit or said memory module, said memory write completion notifying unit notifying a memory write completion when a data write into said memory is completed;

wherein each of said plurality of processor modules comprises:

a cache memory for temporarily storing data to be transferred to and from said memory module;

discriminating means for discriminating whether or not a memory write request for reflecting updated data in said cache memory upon said memory module is under execution; and a control logic unit for executing at least one operation selected from first, second, third, fourth, and fifth operations when an access request to the updated data in said cache memory is issued from another of said plurality of processor modules, wherein:

said first operation transfers the updated data to the other processor module which issued the access request, if the updated data is latest updated data exclusively possessed by the processor module and the memory write request for the updated data is not under execution;

said second operation notifies the other processor module which issued the access request of that the updated data in said cache memory is invalid, after a completion acknowledgment regarding a memory write operation is received from said memory write completion notifying unit, if the updated data is latest updated data exclusively possessed by the processor module and the memory write request for the updated data is under execution;

said third operation urges the other processor module which issued the access request to read the updated data from said memory module after a completion acknowledgment regarding a memory write operation is received from said memory write completion notifying unit, if the updated data is latest updated data exclusively possessed by the processor module and the memory write request for the updated data is being executed;

said fourth operation issues a read request for the updated data to said memory module as a proxy to the other processor module which issued the access request to transfer the updated data from said memory module to the other processor module, after a completion acknowledgment regarding a memory write operation is received from said memory write completion notifying unit, if the updated data is latest updated data exclusively possessed by the processor module and the memory write request for the updated data is being executed; and said fifth operation supplies the updated data in the processor module to the other processor module and invalidates the updated data after a completion acknowledgment regarding a memory write operation is received from said notifying unit, if the updated data is latest updated data exclusively possessed by the processor module and the memory write request for the updated data is under execution.

3. A cache coherency control method for a multiprocessor system including a plurality of processor modules sharing at least one memory module via a bus or a crossbar switch, said method comprising the steps of:

forwarding a cache coherency check request at an address corresponding to a cache miss to other processor modules if the cache miss occurs at any one of said plurality of processor modules;

upon one processor module among said other processor modules receiving a notification of completion of a memory write request, said one processor module executing a first step of notifying said any one of said plurality of processor modules which issued said cache coherency check request as a response to the cache coherency check request that an updated data in a cache memory is invalid if the updated data at an address corresponding to said cache miss is latest updated data exclusively possessed by said one processor module among said other processor modules and if the memory write request was for said updated data; and receiving desired data by said any one of said plurality of processor modules which issued said cache coherency check request by receiving the data from said at least one memory module by issuing a memory read request to said at least one memory module.

4. The cache coherency control method of claim 3, further comprising the steps of:

after said step of forwarding a cache coherency check request, selecting one of said first step and a second step;

upon one processor module among said other processor modules receiving a notification of completion of a memory write request, said one processor module executing said second step of urging said any one of said plurality of processor modules which issued said cache coherence check request to read the updated data from said at least one memory module in response to said cache coherence request if the updated data at the address corresponding to said cache miss is latest updated data exclusively possessed by said one processor module among said other processor modules and if the memory write request was for said updated data; and executing the selected one of said first step and said second step.

5. The cache coherency control method of claim 4, wherein said step of forwarding a cache coherency check request comprises a step of issuing a memory read request to said at least one memory module.

6. The cache coherency control method of claim 3, further comprising the steps of:

after said step of forwarding a cache coherency check request, selecting at least one of said first step and a third step:

upon said one processor module among said other processor modules receiving a notification of completion of the memory write request, said one processor module executing said third step of issuing a read request for the updated data to said memory module as a proxy to the processor module which issued said cache coherency check request to transfer the updated data from said memory module to said processor module which issued said coherency check request if the updated data at the address corresponding to said cache miss is latest updated data exclusively possessed by said one processor module among said other processor modules and if the memory write request was for said updated data, and at the same time, notifying said any one of said plurality of processor modules which issued said cache coherency check request of the issuance of a read request for the updated data in response to said request for a cache coherency check;

executing selected ones of said first step and said third step; and receiving desired data from said at least one memory module by said any one of said plurality of processor modules which issued said cache coherency check request if said third step is selected.

7. A memory write control method for a multiprocessor system including a plurality of processor modules sharing at least one memory module via a crossbar switch, said memory write control method comprising the steps of:

issuing a memory write request to said at least one memory module via the crossbar switch by one of said plurality of processor modules;

any one of said plurality of processor modules forwarding a cache coherency check request at an address corresponding to a cache miss to one of said plurality of processor modules if the cache miss occurs at said any one of said plurality of processor modules;

notifying said one of said plurality of processor modules of a completion of the memory write request by said crossbar switch;

upon said one of said plurality of processor modules which issued said memory write request receiving a notification of said completion of the memory write request from said crossbar switch, said one of said plurality of processor modules, as a response to said cache coherency check request, notifying said any one of said plurality of processor modules which issued said cache coherency check request that updated data in a cache memory is invalid if the updated data at the address corresponding to said cache miss is latest updated data exclusively possessed by said one of said plurality of processor modules which issued said memory write request and if the memory write request was for said updated data; and receiving desired data by said any one of said plurality of processor modules which issued said cache coherency check request by issuing a memory read request to said at least one memory module and by receiving the data from said at least one memory module.

8. A memory write control method for a multiprocessor system including a plurality of processor modules sharing at least one memory module via a bus or a crossbar switch, said memory write control method comprising the steps of:

issuing a memory write request to said at least one memory module via the bus or the crossbar switch by one of said plurality of processor modules;

any one of said plurality of processor modules forwarding a cache coherency check request at an address corresponding to a cache miss to one of said plurality of processor modules if the cache miss occurs at said any one of said plurality of processor modules;

notifying said one of said processor modules of completion of the memory write request by said at least one memory module;

upon said one of said plurality of processor modules which issued said memory write request receiving a notification of said completion of the memory write request from said at least one memory module, said one of said plurality of processor modules, as a response to said cache coherency check request, notifying said any one of said plurality of processor modules which issued said cache coherency check request that updated data in a cache memory is invalid if the updated data at the address corresponding to said cache miss is latest updated data exclusively possessed by said one of said plurality of processor modules which issued the memory write request and if the memory write request was for said updated data; and receiving desired data by said any one of said plurality of processor modules which issued said cache coherency check request by issuing a memory read request to said at least one memory module and by receiving the data from said at least one memory module.

* * * * *